United States Patent Office 2,886,442
Patented May 12, 1959

2,886,442
CHEWING GUM AND METHOD OF PRODUCING

Franklin Kramer, Lexington, and Nicholas J. Kalafatas, Arlington, Mass., assignors to General Foods Corporation, New York, N.Y., a corporation of Delaware No Drawing. Application July 27, 1956
Serial No. 600,381

10 Claims. (Cl. 99—135)

This invention relates to an improved chewing gum of fine texture having a flavor which is controllably released over an extended period of time and to a process for preparing the same.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents e.g. oil of wintergreen, oil of spearmint, oil of peppermint, licorice, fruit flavors, spice oils, etc.; or sweetening agents which may be sugars including sucrose or dextrose and/or they may be artificial sweeteners such as cyclamates or saccharin. Other optional ingredients may also be present.

It is found that when most flavored chewing gums, such as slab gums, are chewed the initial perception of flavor appears after a minute or more at a low level, and after three or four minutes of chewing the flavor intensity drops to an uninteresting level. It is also found upon analysis, that gum chewed for as long as thirty minutes may retain as much as 60% of the flavor initially present, and that this proportion of the flavoring agent is thus not effectively used.

It is an object of this invention to provide a chewing gum containing a flavoring composition characterized by an early flavor perception and an extended period of controlled flavor release. A second object of this invention is to provide a chewing gum containing a flavoring composition which is similar in flavor character to that of the original flavoring oil.

A third object of this invention is to increase the total amount of flavor released during the chewing period of gums containing the herein described flavoring composition. A fourth object of this invention is to obtain a chewing gum having a very fine soft texture. Other objects of this invention will be apparent to those skilled-in-the-art from the following detailed description of the invention.

It has now been discovered that it is possible to obtain a finely textured chewing gum containing a flavoring composition which provides early flavor release, extended flavor perception time, true flavor character, controlled release of a large proportion of flavoring agent, and reduction in amount of flavor oil required. This flavoring composition comprises very fine foam-dried gelatin particles containing therewithin even smaller discrete micro-droplets of a volatile, water-immiscible flavoring agent. Preparation of the flavoring composition employed in the chewing gum product of this invention may be effected by emulsifying the flavoring agent in an aqueous solution of gelatin and foam-drying the so-formed emulsion.

The gelatin which may be employed in this invention may be any of the grades and types of gelatin, including those obtained from e.g. tanner's stock, ossein, pigskin, etc. The Bloom of the gelatin which is employed may vary widely. Although a particularly rapid release may be obtained by use of gelatin having a Bloom of about 50 or less, the Bloom may be as high as 200 or even higher. It is a feature of this invention that chewing gums having a fine, soft texture may be obtained when gelatins of high Bloom (e.g. 235 or 250 Bloom) are used. Although the pH of the gelatin solution employed may fall within the range of 2 to 10, it is preferred that it be maintained in the acid region, e.g. 2 to 5.

In carrying out the process of this invention, a gelatin solution may be formed containing 5 to 100 parts of gelatin per one hundred parts of water, the latter being preferably at temperature of 90° F. to 180° F. during dissolution of the gelatin. The solution is allowed to cool preferably to 33° F. to 75° F., and it is then solidified by foam-drying.

Prior to the foam-drying of the gelatin solution and preferably prior to the foaming but after cooling to 80° F. to 140° F., the desired volatile, water-immiscible flavoring agent may be added to the solution and homogenized to form an emulsion. The flavoring agents which may be employed include oil of peppermint, oil of spearmint, fruit essences, licorice, spice oils, and the like. The selected flavoring agent may be added in an amount equal to 10% to 100% of the weight of the gelatin. Homogenization of the gelatin solution and the oil may be done in any one of various types of apparatus. For example, a Manton-Gaulin homogenizer may be employed wherein the liquid is raised to a pressure which may be as high as e.g. 500–1200 p.s.i.g. and then discharged through a valve as the pressure is released.

Foaming of the gelatin solution is effected by mixing the same at temperature of e.g. 70° F.–150° F. with inert gas, such as nitrogen. Use of inert gas is particularly desirable as it reduces oxidation of the flavoring oils. Although the amount of gas added to the solution may vary, it will usually be added in a volume equal to one-half the volume of solution. The mixture of gas and solution is subjected to thorough mixing as by passage through a Votator which is a combination mixer and heat exchanger. It comprises a rotating shaft within a tube and occupying most of the area thereof, whereby the mixture passing through the tube is confined to a thin annular area. As the mixture passes through the tube, the heat of mixing may raise the temperature thereof. Desired outlet temperature of e.g. 70° F.–80° F. may be maintained by passing cooling medium through a jacket surrounding the mixing tube of the Votator. The foamed mixture may leave the Votator at back pressure of e.g. 155 p.s.i.g. and it is then foam-dried.

The foamed mixture from the Votator may be solidified or dried by pouring it into pre-chilled pans. Here it dries in time which may be 30%–50% of the time required to dry by other procedures.

The solidified foam-dried flavoring composition resembles foam rubber in physical appearance; it has a large number of void spaces distributed within a latticework of flavoring composition. Density of this material may be e.g. 0.5–0.8, preferably about 0.625. Because of its physical state, it may be ground to e.g. 20–400 mesh particles in times which may be as little as 50% of that required to reduce e.g. slab-dried material to the same size. It is quite stable and may be stored as such for extended period.

Formation of flavored chewing gum may be effected by mixing from 3% to 30%, by weight of foam-dried flavoring composition with from 70% to 97%, by weight of gum base. A preferred composition has 15% of foam-dried flavoring composition in 85% by weight of gum base. Typically the gum base will be chicle, although it may be jelutong, guttakay, etc. Other ingredients including sweetening agents, coloring agents, etc. may be present in desired amount.

Although the chewing gums of this invention may be prepared from a single flavoring agent, it is possible to extend the range of properties of the gum by use of combinations of two or more foam-dried flavoring compositions. For example, it is possible to separately prepare foam-dried flavoring compositions from gelatins of various Blooms, and then to add these compositions to a gum. Such a chewing gum may, for example, contain a mixture of flavoring compositions prepared from a low Bloom gelatin (characterized by a rapid flavor release) and a high Bloom gelatin (characterized by a longer flavor release). The properties of the chewing gum product will be intermediate to the properties obtained from each of the flavoring compositions when used separately. Specifically if a flavoring composition formed from 50 Bloom gelatin is mixed with a flavoring composition formed from 200 Bloom gelatin, and the mixture is added to a chewing gum, the product may have a flavor release which is substantially more even over the chewing period than is the case when a single flavoring composition is employed.

Similarly it is possible to modify the properties of the product gum by use of mixtures of foam-dried flavoring compositions characterized by different ratios of gelatin to oil. If a composition containing 10% flavoring agent and 90% gelatin is mixed with one containing 50% flavoring agent and 50% gelatin the resulting blended flavoring composition will yield a chewing gum having a more even liberation of flavor than is obtained by use of either flavoring agent alone.

Liberation of flavor of the product chewing gum of this invention may also be modified in controlled manner to obtain an even, sustained flavor level from the time chewing begins and thereafter for a protracted period of time far in excess of that obtained today in any chewing gum, by using mixtures of flavoring compositions (a) of different particle size, the resulting gum deriving much of its initial flavor from the smaller particles and much of its later flavor from the larger particles; or (b) formed from gelatins of different pH, the composition formed from gelatin of higher pH (e.g. 6) giving quick release of flavor, while that formed from lower pH (e.g. 2.5) giving slower release.

It is also possible to obtain chewing gum products having extended flavor liberation time by use of the herein described foam-dried fixed flavors in combination with unfixed flavors. One particularly desirable product contains unfixed flavor and foam-dried flavor in proportions of about 4:1. This product is characterized by an interesting or pleasing flavor level which may start very early and last for 7–9 minutes. Over substantially the entire period of flavor release, the flavor level is higher than that of the standard gum, and the flavor is rich, full, and true.

Chewing gums containing the foam-dried flavoring compositions of this invention, especially those prepared from higher Bloom gelatins, are particularly characterized by the combination of soft, fine, non-gritty texture and long lasting flavor.

It is particularly characteristic of the chewing gum product of this invention, that it has a very early flavor perception when chewed. Usually flavor is apparent in not more than in four or five seconds when chewing gums prepared in accordance with this invention. Prior art chewing gums containing only free unfixed flavor have initial flavor perception after 7–10 seconds and frequently after times as long as one minute.

It is also characteristic of this chewing gum product that it retains its flavor under conditions of vigorous chewing for extended periods which may be double that of compositions heretobefore known to those skilled-in-the-art. For example, the flavor perception time may be as long as seven to nine minutes, in contrast to the usual three or four minutes which is the flavor perception time of comparable products heretofore known.

The chewing gum so formed is also characterized by high degree of flavor release. The products herein described may retain as little as 25%–35% of the flavor originally present after mastication for 30 minutes. Gums heretofore available, when chewed for the same time, are found to retain as much as 60% of the flavor originally present which is being released at such a slow rate that the intensity of flavor is at an uninteresting level.

The greater availability of flavor by use of the foam-dried flavoring compositions herein described also permits attainment of high flavor level in the chewing gum products with use of lower amounts of the flavoring oils.

Chewing gums prepared with the foam-dried flavor composition in accordance with this invention, have a flavor character more nearly that of the original flavor oil than chewing gum prepared by the direct incorporation of the flavoring oil into the chewing gum. This may be due in part at least to presence of inert gas during the foam drying, which may reduce the amount of oxidation of flavoring oil during the drying procedure.

The following specific examples will serve to illustrate preferred embodiments of this invention:

*Example I*

According to a specific example of this invention, a 25% gelatin solution was prepared by adding to 33.75 pounds of water at room temperature, 11.25 pounds of neutral type gelatin having a Bloom of 235, a viscosity of 44 mp., and a pH of 5.85. The gelatin was allowed to soak and solution was then effected by heating to 140° F. pH was adjusted to 3.5 by addition of concentrated hydrochloric acid. 3.75 pounds of oil of peppermint was added with continuous mechanical stirring and the mixture was homogenized in a Manton-Gaulin homogenizer, for 30 minutes at 1200 p.s.i.g. and at 135° F.–139° F.

Nitrogen gas, in amount corresponding to 50% by volume of the solution was admitted and the mixture was passed through a Votator under a back pressure of 155 p.s.i.g. Outlet temperature from the Votator was 80° F. The foamed mixture was passed into pre-chilled pans and solidified by cooling at 50° F. to form product having density of 0.620. The resulting product was dried and ground to fineness of 20 mesh–400 mesh.

18 parts by weight of this flavoring composition was blended with 100 parts by weight of chicle. Mixing was effected in a ribbon blender with jacketed side walls.

*Example II*

According to another specific example of this invention a 41% gelatin solution was prepared by adding to 16.25 pounds of water at room temperature, 11.25 pounds of 40 Bloom neutral gelatin having viscosity of 19 mp. and pH of 6.7. The gelatin was allowed to soak and solution was then effected by heating to 140° F. 3.75 pounds of oil of peppermint was added with continuous mechanical stirring and the mixture was homogenized in a Manton-Gaulin homogenizer, for 35 minutes at 1200 p.s.i.g.

Nitrogen gas in amount corresponding to 50% by volume of the solution was admitted and the mixture passed through a Votator under a back pressure of 155 p.s.i.g. Outlet temperature from the Votator was 80° F. The foamed mixture was collected in pre-chilled pans and solidified by cooling at 50° F. to form a product having density of 0.625. The resulting product was dried and ground to fineness of 20 mesh–400 mesh.

18 parts by weight of this flavoring composition were blended with 100 parts by weight of chicle. Mixing was effected in a ribbon blender with jacketed side walls.

A taste test was made to compare cured chewing gum products of this invention with a cured standard chewing gum containing the same total amount of flavor in unfixed form. During the tests, 0.5" x 0.75" x 0.0625 slabs of each gum were separately chewed and the following were noted: time and intensity of initial flavor, extent of flavor burst, duration of interesting flavor level, and approximate total time during which flavor was available. In these tests, the rating of flavor intensity was measured by the person chewing, on a scale ranging from 0 to 10, the level of 1 indicating threshold flavor intensity just discernable to the taste, and a level of 10 indicating a maximum intensity above which the sensation originating in the flavor is unpleasant.

The commercially available standard containing unfixed flavor in chicle was characterized by initial indication of flavor at a level of 1 after 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

The second sample tested contained 100% foam-dried flavoring composition, prepared in accordance with the above Example I. Initial liberation of flavor occurred after about 5 seconds at a level of 2. It rose to about 9 after 60 seconds and maintained a high of 9 at 60–90 seconds. Thereafter the flavor intensity dropped slowly; at 2 minutes, the level was 8; at 4 minutes, the level was 6; at 6 minutes, the level was 3. At 7 minutes, the flavor intensity had dropped to about 1, the threshold level.

For ease of comparison, the flavor profiles of the two samples are tabulated hereafter:

| Time | 100% Unfixed Oil | 100% Foam-Dried Oil |
| --- | --- | --- |
| 5 Seconds | | 2 |
| 6 Seconds | | |
| 7 Seconds | 1 | 3 |
| 10 Seconds | 2 | 4 |
| 15 Seconds | 3 | 5 |
| 20 Seconds | 4 | 6 |
| 30 Seconds | 5 | 7 |
| 60 Seconds | 6 | 9 |
| 90 Seconds | 3 | 9 |
| 2 Minutes | 1.5 | 8 |
| 3 Minutes | 1 | 8 |
| 4 Minutes | 1 | 6 |
| 5 Minutes | | 4 |
| 6 Minutes | | 3 |
| 7 Minutes | | 1 |

From the above taste test, it is apparent that chewing gum containing the foam-dried flavoring composition of this invention is particularly characterized by an early flavor liberation, which may occur in about five seconds. This initial liberation is higher than the initial intensity of chewing gum containing the same amount of flavor in free unfixed form. It is also apparent that the total flavor liberated from the chewing gum products of this invention may be e.g. over three times that of the standard gum, and that this flavor may be liberated over a period of 7 minutes, while that of the comparable standard gum is liberated in only about 3 minutes. The flavor intensity of the new gum containing 100% foam-dried flavoring composition is at a level over most of the chewing period, higher than the maximum level reached with the standard gum.

During the test, it is particularly apparent that the chewing gum prepared according to this invention has a texture which is much softer and finer than the standard gum, and that this feature together with the above-noted flavor characteristics, contributes to the eminently desirable quality of the gum.

The term "encapsulate" may be used to describe the relation of the gelatin and the flavoring agent and means that the latter, in the form of a foam-dried emulsion of discrete microdroplets, is distributed substantially uniformly within finely divided particles of the former. The flavoring agent is locked in within the gelatin to the extent that the former is released substantially only as the molecules of gelatin are dissolved from the surface of the individual gelatin particles by the action of salivary liquids.

Although we have herein described specific examples showing certain details of our invention, it will be apparent to those skilled-in-the-art that various modifications and changes may be made which come within the scope of this invention.

What is claimed is:

1. A chewing gum comprising very fine, foam-dried gelatin particles containing therewithin discrete micro-droplets of a volatile, water-immiscible flavoring agent, and an all-enveloping mass of a chewable gum base within which the particles are substantially uniformly distributed.

2. A chewing gum comprising 20–400 mesh foam-dried gelatin particles containing therewithin discrete micro-droplets of a volatile, water-immiscible flavoring agent, and an all-enveloping mass of a chewable gum base within which the particles are substantially uniformly distributed.

3. A chewing gum as claimed in claim 2 wherein said chewable gum base within which the particles of foam-dried gelatin are substantially uniformly distributed contains free unfixed flavoring agent.

4. A chewing gum comprising 3% to 30% by weight of very fine foam-dried gelatin particles containing therewithin discrete micro-droplets of a volatile water-immiscible flavoring agent, and 70% to 97% by weight of an all-enveloping mass of a chewable gum base within which the particles are substantially uniformly distributed.

5. A chewing gum comprising very fine foam-dried high Bloom gelatin particles containing therewithin discrete micro-droplets of a volatile water-immiscible flavoring agent, and an all-enveloping mass of a chewable gum base within which the particles are substantially uniformly distributed.

6. A chewing gum as claimed in claim 5 wherein said gelatin has a Bloom of about 200–250 whereby flavor is released over an extended period of time.

7. A chewing gum comprising very fine, foam-dried particles of low pH gelatin characterized by slow flavor release and very fine, foam-dried particles of high pH gelatin characterized by rapid flavor release, each containing dispersed therewithin discrete micro-droplets of a volatile water-immiscible flavoring agent, and an all-enveloping mass of a chewable gum base within which the particles are substantially uniformly distributed whereby as the chewing gum is chewed the flavor is released at high flavor intensity substantially evenly and uniformly over the extended chewing time.

8. A chewing gum comprising very fine, foam-dried particles of low Bloom gelatin characterized by rapid flavor release, and very fine, foam-dried particles of high Bloom gelatin characterized by slow flavor release, each containing dispersed therewithin discrete micro-droplets of a volatile water-immiscible flavoring agent, and an all-enveloping mass of a chewable gum base within which the particles are substantially uniformly distributed whereby as the chewing gum is chewed the flavor is released at high flavor intensity substantially evenly and uniformly over the extended chewing time.

9. The method of preparing a chewing gum comprising forming very fine, solid, foam-dried gelatine particles containing therewithin a volatile, water-immiscible flavoring agent, and substantially uniformly distributing said gelatin containing flavoring agent within an all-enveloping mass of a chewable gum base.

10. The method of preparing a chewing gum comprising forming a gelatin solution, mixing therewith a volatile, water-immiscible flavoring agent thereby forming an emulsion, foam-drying said emulsion whereby a solid is formed containing therewithin said flavoring agent in the form of discrete micro-droplets, reducing said solid foam-dried gelatin to particles, and substantially uniformly distributing said gelatin particles containing flavoring agent within an all-enveloping mass of a chewable gum base.

References Cited in the file of this patent

UNITED STATES PATENTS

| | | |
|---|---|---|
| 1,526,039 | Arkell et al. | Feb. 10, 1925 |
| 1,993,289 | Stokes et al. | Mar. 5, 1935 |
| 2,157,839 | Wertheimer | May 9, 1939 |
| 2,258,567 | Epstein et al. | Oct. 7, 1941 |